(12) United States Patent
Kuronuma

(10) Patent No.: US 12,013,723 B2
(45) Date of Patent: Jun. 18, 2024

(54) HEAD MOUNTED DISPLAY

(71) Applicant: Sony Interactive Entertainment Inc., Tokyo (JP)

(72) Inventor: Toru Kuronuma, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 343 days.

(21) Appl. No.: 17/428,383

(22) PCT Filed: Feb. 8, 2019

(86) PCT No.: PCT/JP2019/004606
§ 371 (c)(1),
(2) Date: Aug. 4, 2021

(87) PCT Pub. No.: WO2020/161882
PCT Pub. Date: Aug. 13, 2020

(65) Prior Publication Data
US 2022/0137663 A1   May 5, 2022

(51) Int. Cl.
*G06F 1/16* (2006.01)
*G02B 27/01* (2006.01)
*G02B 27/02* (2006.01)

(52) U.S. Cl.
CPC ......... *G06F 1/163* (2013.01); *G02B 27/0176* (2013.01); *G02B 27/02* (2013.01); *G02B 27/028* (2013.01)

(58) Field of Classification Search
CPC ..... G06F 1/163; G06F 3/011; G02B 27/0176; G02B 7/002; G02B 27/02; G02B 27/028;
(Continued)

(56) References Cited

U.S. PATENT DOCUMENTS 8,040,292 B2 * 10/2011 Ronzani .............. G02B 27/017
345/87
10,251,292 B2   4/2019 Araki
(Continued)

FOREIGN PATENT DOCUMENTS

CN       109358424 A  *  2/2019   ......... G02B 27/0176
JP       2002247484 A     8/2002
(Continued)

OTHER PUBLICATIONS

International Preliminary Report on Patentability and Written Opinion for corresponding PCT Application No. PCT/JP2019/004606, 18 pages, dated Aug. 19, 2021.
(Continued)

*Primary Examiner* — Adrian S Wilson
*Assistant Examiner* — Gage Crum
(74) *Attorney, Agent, or Firm* — Matthew B. Dernier, Esq.

(57) ABSTRACT

An HMD includes a mounting band for surrounding a head H of a user. The mounting band includes a case, a stretching unit, an adjustment mechanism that adjusts a length of the stretching unit to be accommodated in the case by relatively moving the stretching portion with respect to the case, a winding target member, and a spring member which is fixed at a front portion thereof to the stretching unit and at a rear portion thereof wound on the winding target member and in which an unwinding amount from the winding target member changes according to the length of the stretching unit accommodated in the case. The spring member generates elastic force that acts in a direction in which the stretching portion is accommodated into the case. A first elastic force of the spring member generated by a first unwinding amount and a second elastic force of the spring member generated by a second unwinding amount are equal to each other.

12 Claims, 13 Drawing Sheets

(58) Field of Classification Search
CPC ....... A61F 9/027; G02C 3/003; A61B 5/6803; A42B 3/324; A42B 3/145
See application file for complete search history.

(56) References Cited

U.S. PATENT DOCUMENTS

| | | | | |
|---|---|---|---|---|
| 10,747,005 | B1* | 8/2020 | Sullivan | ............ G02B 27/0176 |
| 10,845,604 | B2 | 11/2020 | Morimoto | |
| 11,150,695 | B1* | 10/2021 | Smith | ..................... G06F 3/011 |
| 11,181,748 | B1* | 11/2021 | Williamson | ....... G02B 27/0176 |
| 2005/0262619 | A1* | 12/2005 | Musal | ................... A42B 3/066 |
| | | | | 2/421 |
| 2015/0074876 | A1* | 3/2015 | Chiang | ................. A42B 3/145 |
| | | | | 2/418 |
| 2015/0219901 | A1* | 8/2015 | Morimoto | ......... G02B 27/0176 |
| | | | | 345/8 |
| 2017/0227793 | A1* | 8/2017 | Abreu | .................... H04R 1/028 |
| 2017/0296121 | A1* | 10/2017 | Dar | ....................... A61N 1/0484 |
| 2018/0027676 | A1* | 1/2018 | Araki | .................. H05K 5/0017 |
| | | | | 361/679.01 |

FOREIGN PATENT DOCUMENTS

| | | |
|---|---|---|
| JP | 2010245873 A | 10/2010 |
| JP | 2014068184 A | 4/2014 |
| JP | 2017528245 A | 9/2017 |
| WO | 2016136657 A1 | 9/2016 |

OTHER PUBLICATIONS

Notice of Reasons for Refusal for corresponding JP Application No. 2020570308, 4 pages, dated Oct. 24, 2022.
International Search Report for corresponding PCT Application No. PCT/JP2020/004606, 4 pages, dated Apr. 23, 2019.

* cited by examiner

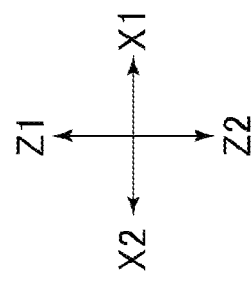
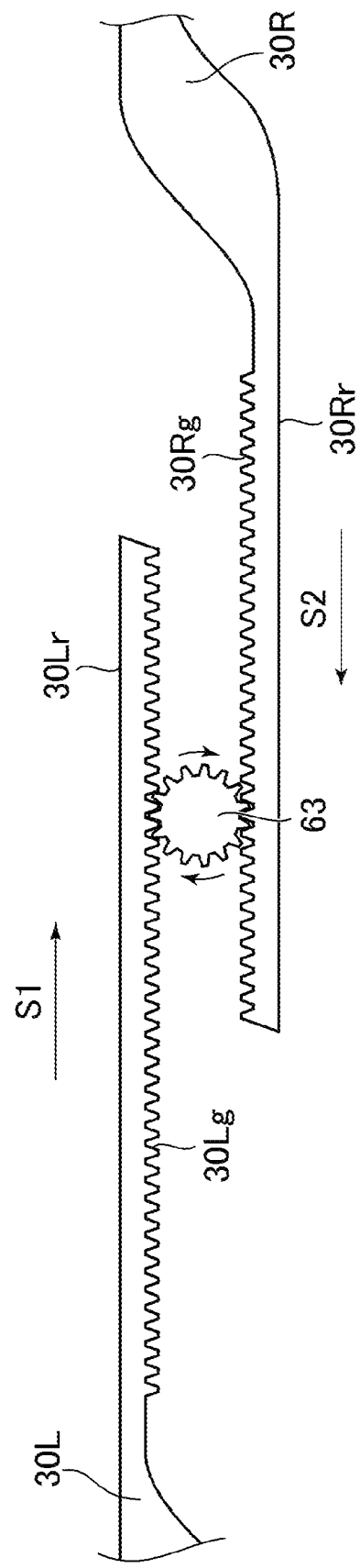

HEAD MOUNTED DISPLAY

TECHNICAL FIELD

The present invention relates to a head mounted display.

BACKGROUND ART

Development of a head mounted display that is mounted on the head of and utilized by a user is proceeding. As disclosed in PTL 1, a head mounted display includes a main body including a display for being arranged in front of the eyes of a user and a mounting band that supports the main body and surrounds the head of the user.

CITATION LIST

Patent Literature

[PTL 1] WO 2016/136657 [PTL 2] JP 2014-68184A

SUMMARY

Technical Problem

In PTL 1, the head mounted display adopts a configuration that uses a rubber band such that elastic force that acts in a direction in which the magnitude of the whole circumference of the mounting band is reduced is generated to temporarily mount the mounting band on the head of the user. Here, the rubber band increases the elastic force more as it is pulled more in a direction in which the whole circumference of the mounting band is increased. Therefore, an operation for mounting the mounting band on the head sometimes becomes a burden on the user. It is to be noted that PTL 2 discloses a head mounted display for medical use that uses a constant load spring that generates fixed elastic force in order to adjust the mounting position of an image displaying device. However, PTL 2 does not disclose a technology for reducing the operation burden on the user when a mounting band is mounted on the head of the user.

One of objects of the present specification is to propose a head mounted display that reduces the load applied to a user when the user mounts a mounting band.

Solution to Problem

An example of a head mounted display proposed by the present disclosure is a head mounted display having a mounting band for surrounding a head of a user, in which the mounting band includes a case that configures a rear portion of the mounting band, a stretching unit that configures a side portion of the mounting band and that extends from a front side toward a rear side, at least part of a rear portion of the stretching unit being accommodated in the case, an adjustment mechanism that adjusts a length of the stretching unit to be accommodated in the case by relatively moving the stretching unit with respect to the case, a winding target member accommodated in the case, and a spring member which is fixed at a front portion thereof to the stretching unit and is wound at a rear portion thereof on the winding target member and in which an unwinding amount from the winding target member changes according to the length of the stretching unit accommodated in the case, the spring member generating elastic force to act in a direction in which the stretching unit is accommodated into the case, first elastic force generated by a first unwinding amount and second elastic force generated by a second unwinding amount that is different from the first unwinding amount being equal to each other.

According to the head mounted display described above, the load applied to the user when the user mounts the mounting band can be reduced.

BRIEF DESCRIPTION OF DRAWINGS

FIG. 9 is a view illustrating adjustment of a length of a stretching unit in the present embodiment.

DESCRIPTION OF EMBODIMENT

In the following, an embodiment of the present invention is described with reference to the drawings. In the following description, directions indicated by reference signs Y1 and Y2 in the figures represent a forward direction and a rearward direction, respectively; directions indicated by reference signs Z1 and Z2 in the figures represent an upward direction and a downward direction, respectively; and directions indicated by reference signs X1 and X2 in the figures represent a rightward direction and a leftward direction, respectively. The directions mentioned indicate directions as viewed from a user who has a head mounted display 1 mounted thereon. Further, in the following description, the head mounted display 1 is referred to as an HMD 1.

Figure 3:
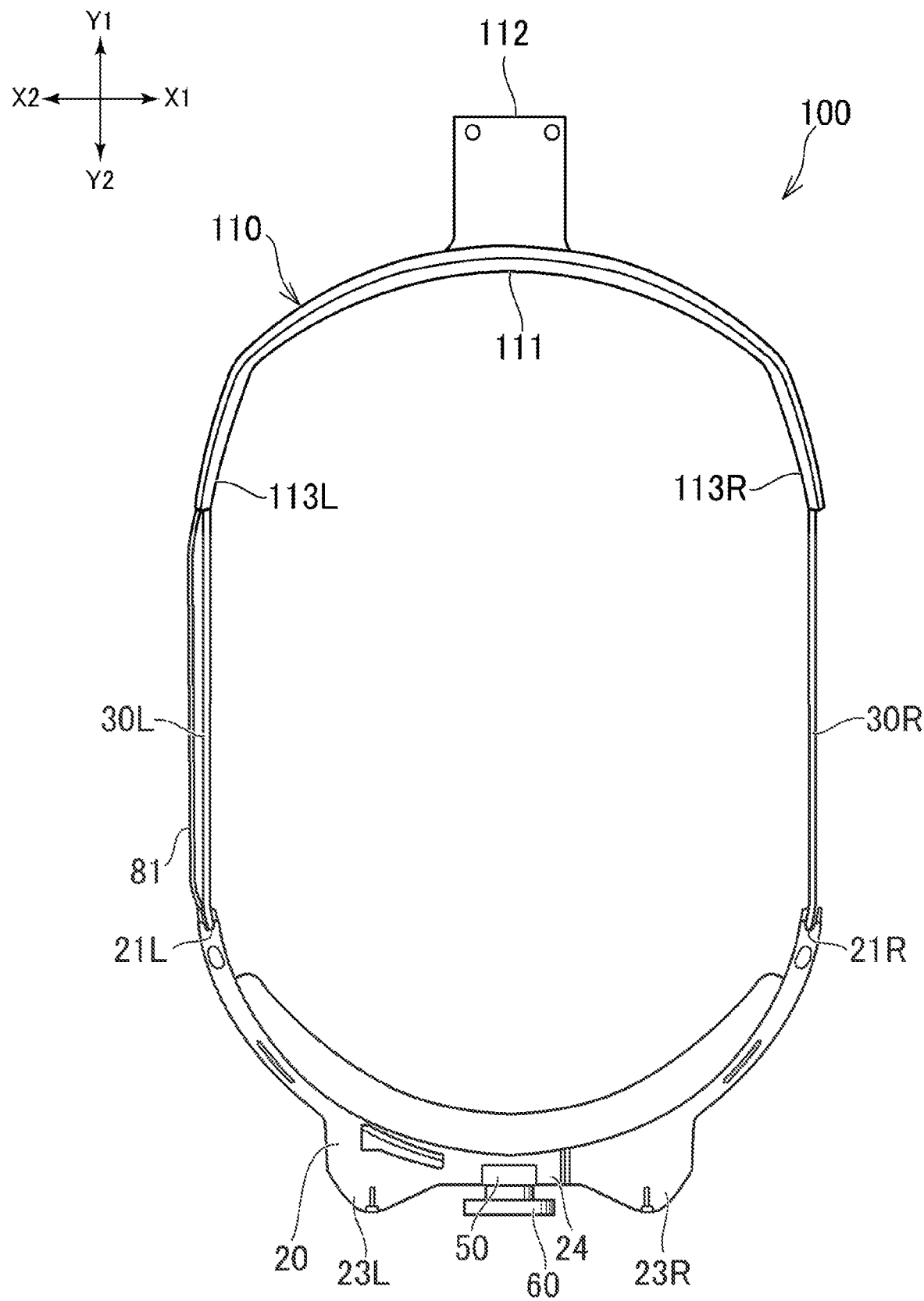
FIG. 3 is a top plan view depicting the mounting band of the HMD according to the present embodiment and is a view depicting a state in which the whole circumference of the mounting band is expanded.
Figure 4:
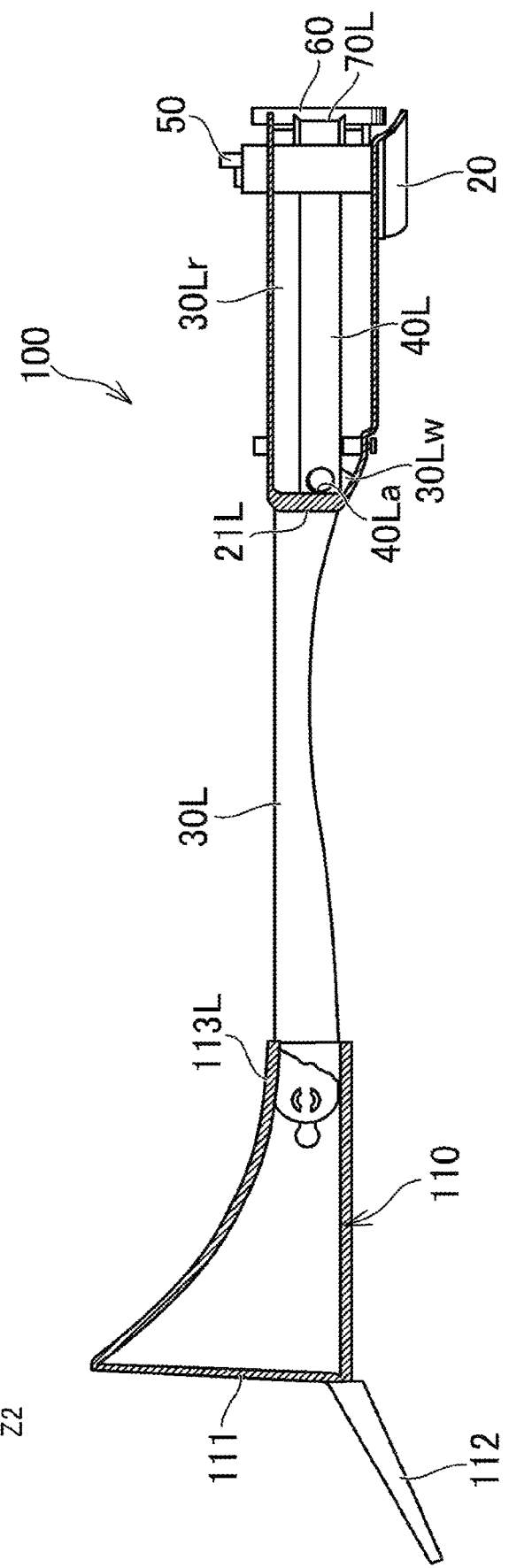
FIG. 4 is a left side elevational view depicting an internal configuration of the mounting band of the HMD according to the present embodiment and is a view depicting a state in which the whole circumference of the mounting band is expanded.
Figure 5:
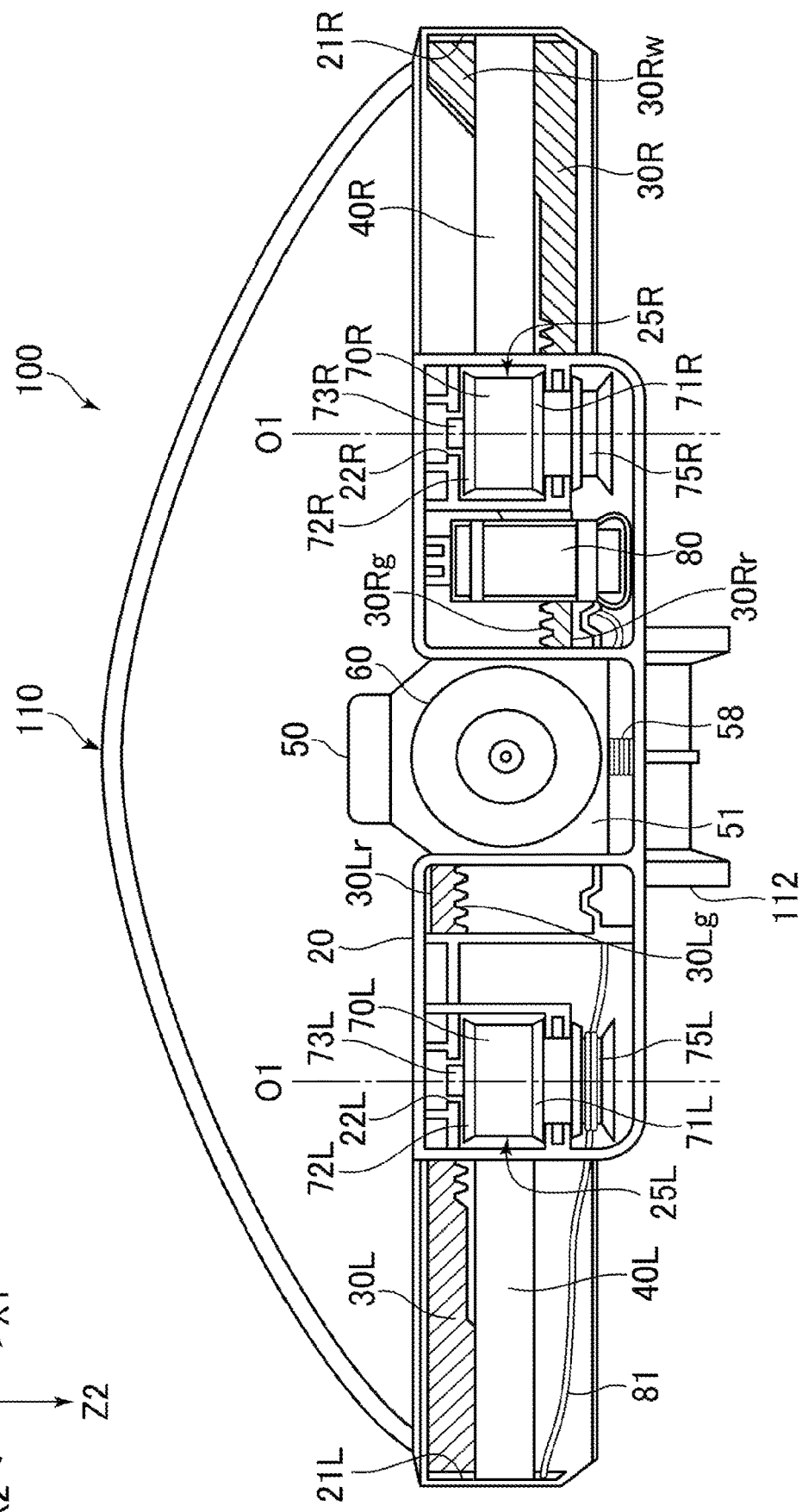
FIG. 5 is a rear elevational view of an internal configuration of the mounting band of the HMD according to the present embodiment and is a view depicting a state in which the whole circumference of the mounting band is expanded.
Figure 6:
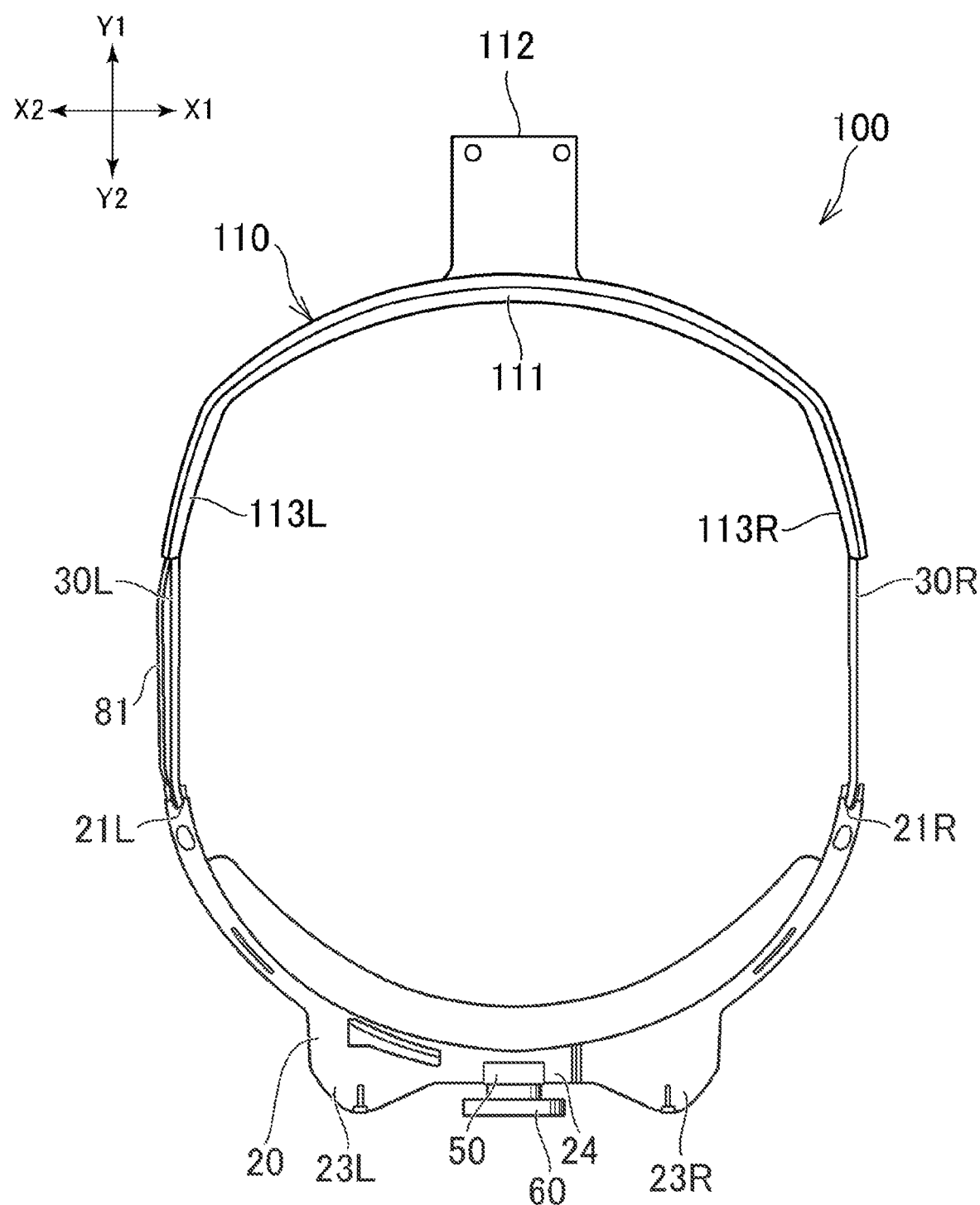
FIG. 6 is a top plan view depicting the mounting band of the HMD according to the present embodiment and is a view depicting a state in which the whole circumference of the mounting band is contracted.
Figure 7:
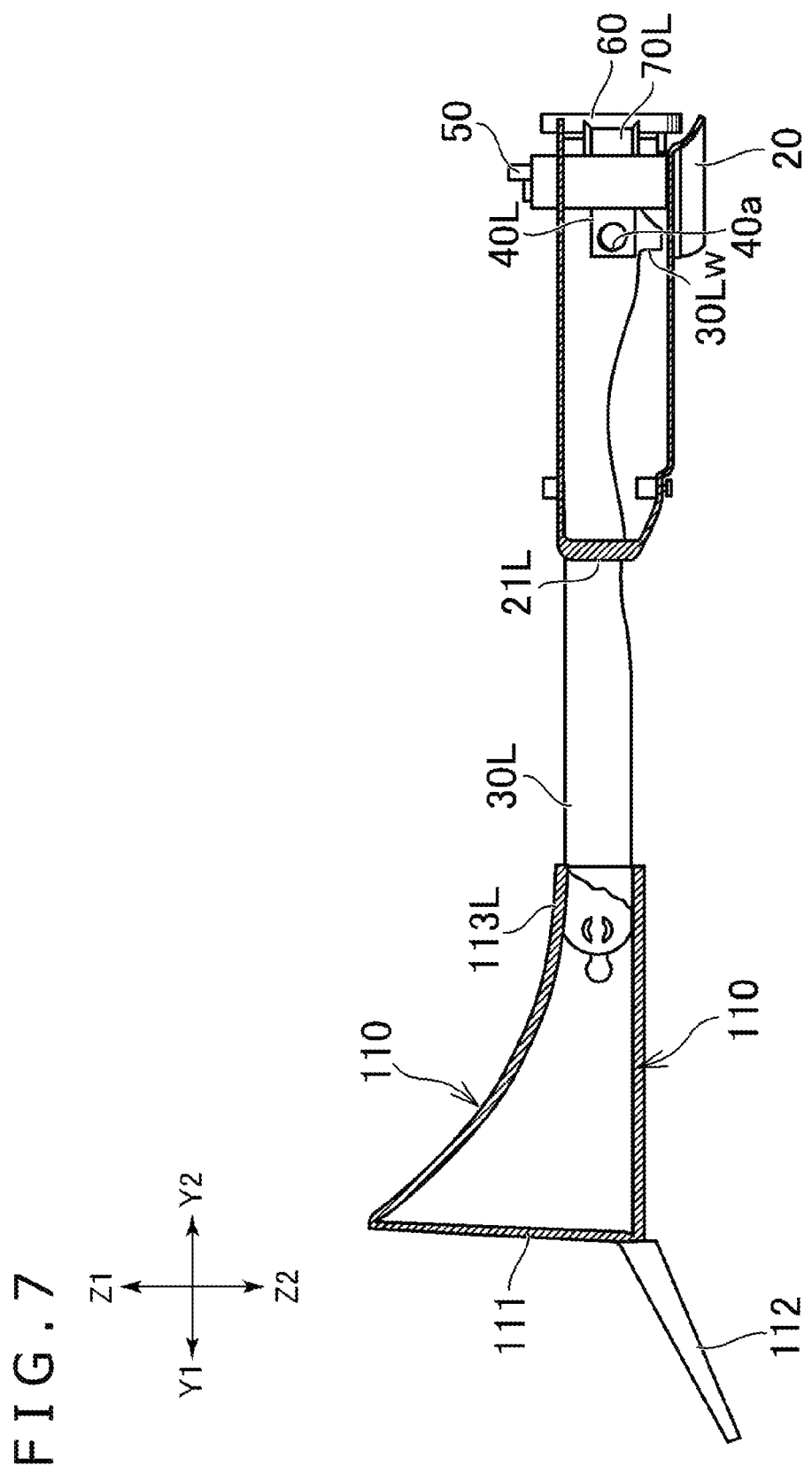
FIG. 7 is a left side elevational view depicting an internal configuration of the mounting band of the HMD according to the present embodiment and is a view depicting a state in which the whole circumference of the mounting band is contracted.
Figure 8:
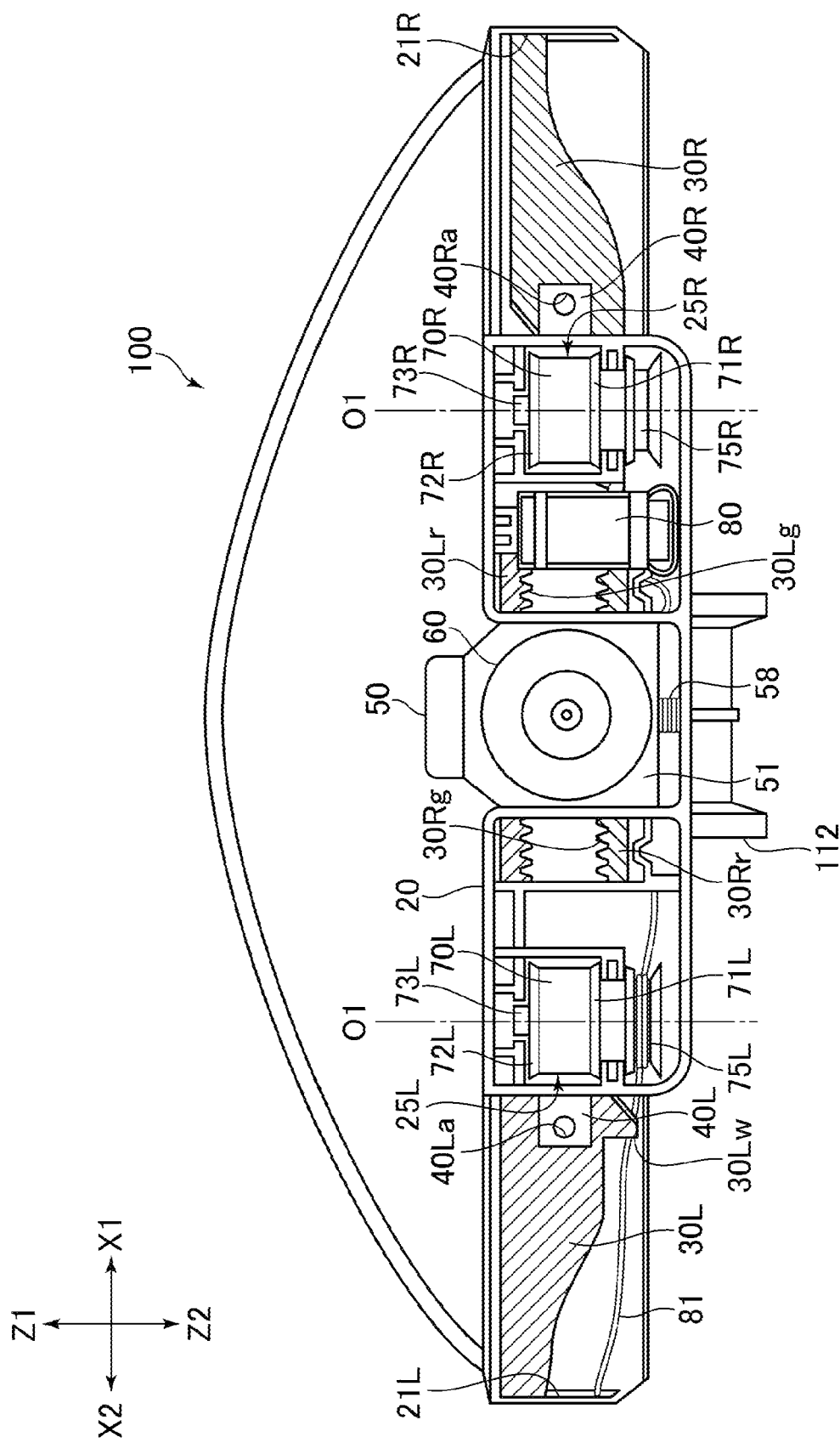
FIG. 8 is a rear elevational view depicting an internal configuration of the mounting band of the HMD according to the present embodiment and is a view depicting a state in which the whole circumference of the mounting band is contracted.

It is to be noted that FIGS. 3 to 5 depict a state in which the whole circumference of a mounting band 100 is expanded, and FIGS. 6 to 8 depict a state in which the whole circumference of the mounting band 100 is contracted. Further, in FIGS. 2, 4, 5, 7, and 8, in order to depict an internal structure of a case 20, part of an exterior configuring the case 20 is omitted.

Figure 1:
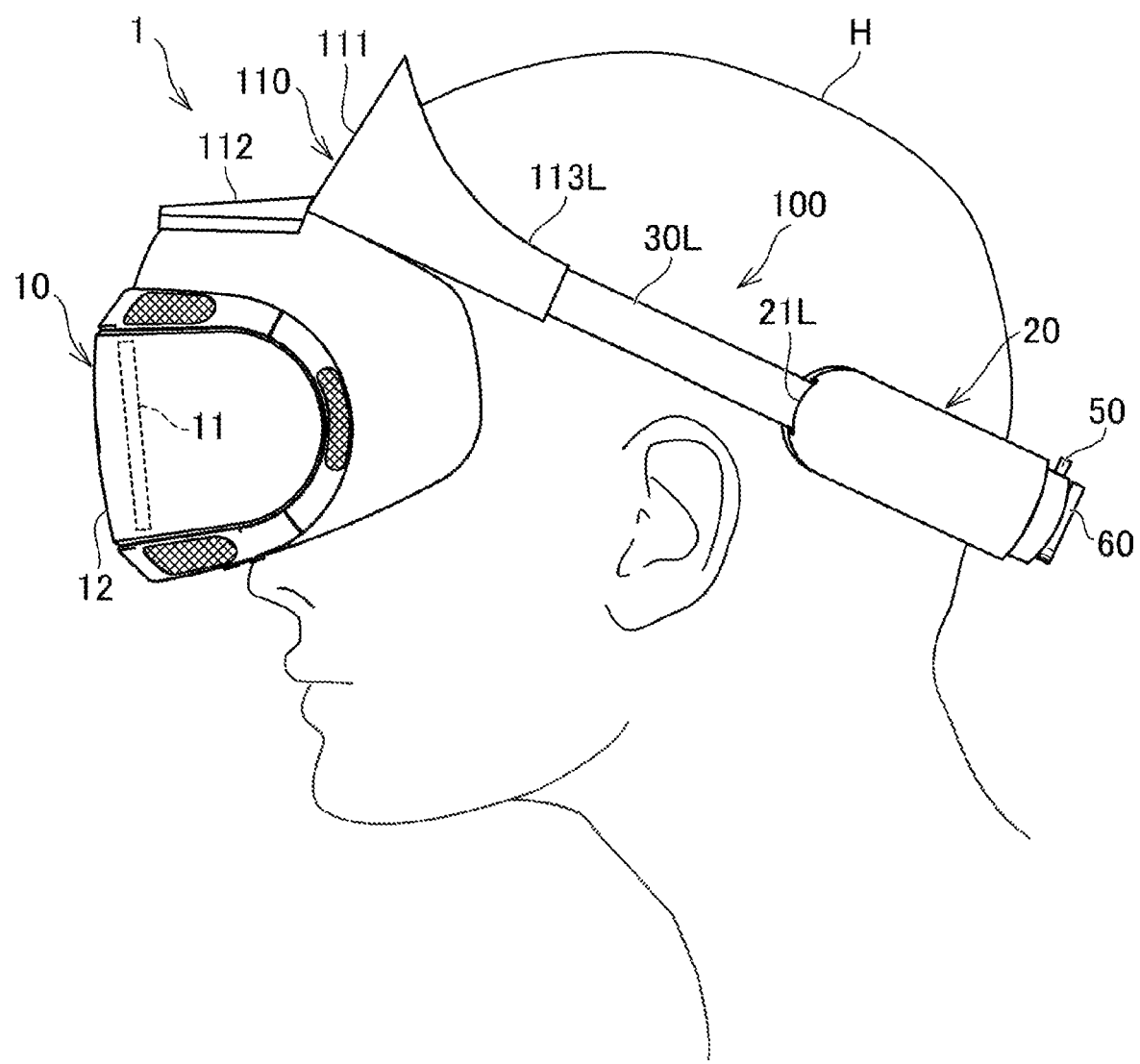
FIG. 1 is a view depicting a use state of a head mounted display (HMD) according to an embodiment.
Figure 2:
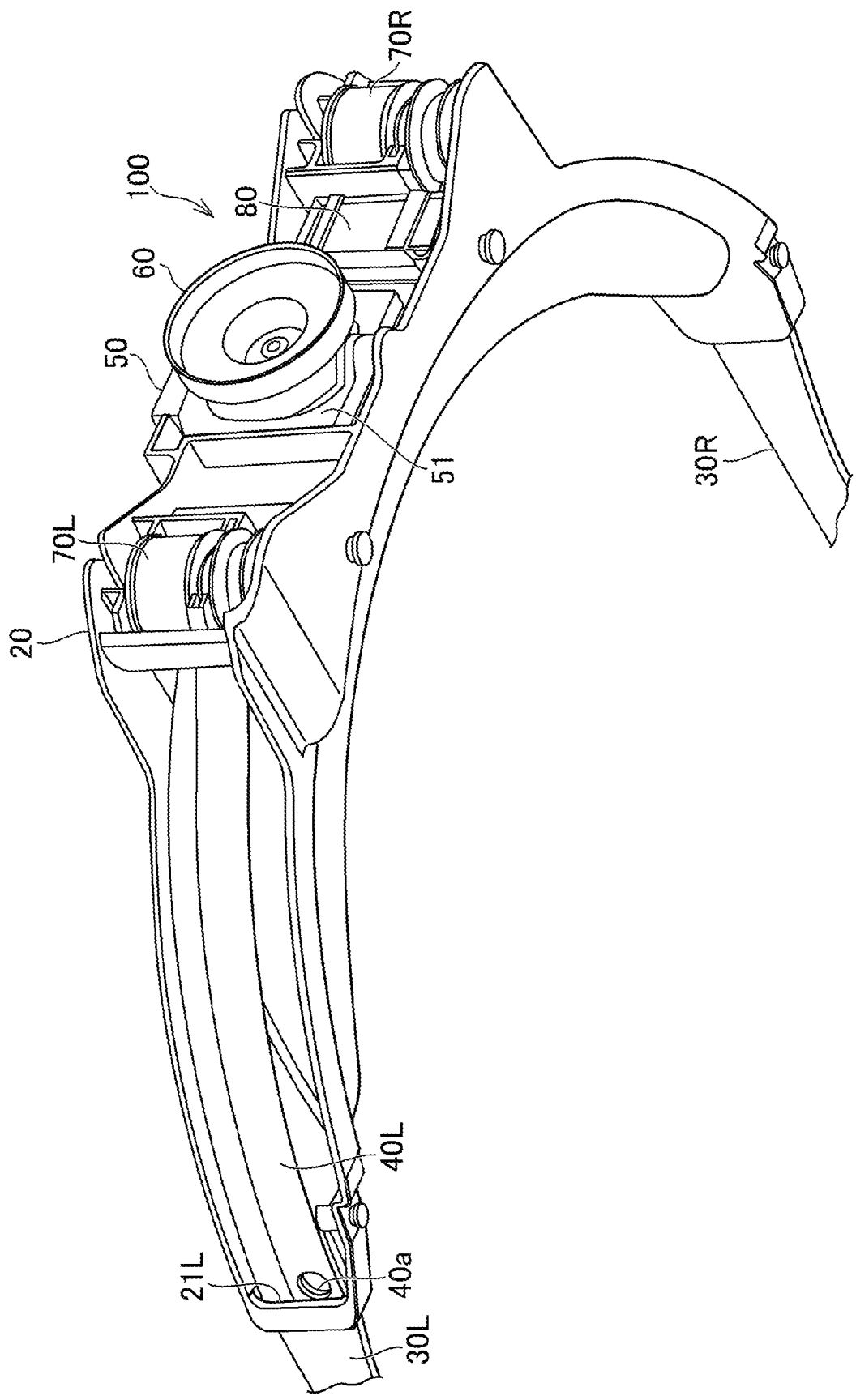
FIG. 2 is a top plan view depicting a mounting band of the HMD according to the present invention and is a view depicting a state in which the whole circumference of the mounting band is expanded.

[Overview of General Configuration of HMD 1] As depicted in FIG. 1, the HMD 1 includes a device main body 10 and a mounting band 100.

The device main body 10 includes a display device 11 and a housing 12 in which the display device 11 is accommodated. The display device 11 is, for example, a liquid crystal display device or an organic electroluminescence display device; however, the type of the display device is not particularly limited. When the HMD 1 is used, the device main body 10 covers the front of the eyes of the user.

The mounting band 100 extends from the device main body 10 to the rear side. When the HMD 1 is used, the mounting band 100 surrounds a head H of the user. The mounting band 100 has an annular shape as viewed in plan (top plan) as depicted in FIGS. 3, 6, and so forth, and the head H is arranged on the inner side of the mounting band 100. In the example of the HMD 1, the mounting band 100 extends rearwardly and besides obliquely downwardly. However, this is not restrictive, and the mounting band 100 may extend horizontally.

In the example of the HMD 1, the mounting band 100 has, at a front portion thereof, a front member 110 to which the device main body 10 is connected. As depicted in FIG. 3, 6, and so forth, the front member 110 has a forehead pad 111, a connection portion 112 extending forwardly from the forehead pad 111 and having an upper portion of the device main body 10 connected thereto, a right portion 113R extending rearwardly from the forehead pad 111, and a left portion 113L extending rearwardly from the forehead pad 111.

When the HMD 1 is used, the forehead pad 111 of the front member 110 is applied to the front face of the head H of the user. A cushion may be provided on an inner face (rear face) of the forehead pad 111. Further, the inner face (rear face) of the forehead pad 111 may be curved so as to fit with the front face of the head H.

[Stretching Portion 30] The mounting band 100 has a right stretching unit 30R configuring a right side portion of the mounting band 100 and a left stretching unit 30L configuring a left side portion of the mounting band 100. The right stretching unit 30R is fixed at a front portion thereof to the right portion 113R of the front member 110 and extends rearwardly. The left stretching unit 30L is fixed at a front portion thereof to the left portion 113L of the front member 110 and extends rearwardly.

It is to be noted that, in the following description, in a case where the left and the right are not distinguished from each other, each of the right and left stretching units 30R and 30L is referred to merely as a stretching unit 30. Also in regard to other components, a component arranged on the right side is denoted by a reference sign with the symbol R added thereto, a component arranged on the left side is denoted by the reference sign with the symbol L added thereto, and in a case where left and right components are not distinguished from each other, each of them is denoted only by a reference numeral.

It is to be noted that the structure of the mounting band 100 is not restricted to that of the example of the HMD 1. For example, the mounting band 100 may not include the front member 110. In this case, the right and left stretching units 30R and 30L may be connected at the respective front portions thereof directly to the device main body 10. In other words, the right stretching unit 30R may be fixed to a right side portion of the device main body 10, and the left stretching unit 30L may be fixed to a left side portion of the device main body 10.

[Case 20] The mounting band 100 includes a case 20 that configures a rear portion of the mounting band 100. When the HMD 1 is used, the case 20 is applied to the rear side of the head H (refer to FIG. 1). A cushion may be provided on the inner face (front face) of the case 20. In the example of the HMD 1, the case 20 has a shape curved arcuately.

As depicted in FIGS. 5, 8, and so forth, the right stretching unit 30R and the left stretching unit 30L are accommodated at least part of rear portions 30Rr and 30Lr thereof in the case 20. The rear portion 30Rr of the right stretching unit 30R is accommodated in the inside of the case 20 through an opening 21R formed at a front end of a right portion of the case 20, and the rear portion 30Lr of the left stretching unit 30L is accommodated in the inside of the case 20 through an opening 21L formed at a front end portion of a left portion of the case 20.

It is to be noted that each stretching unit 30 preferably has, at least at part thereof, a width greater than that of the opening 21 in the upward and downward direction. In particular, as depicted in FIGS. 5, 7, 8 and so forth, preferably the right stretching unit 30R has a wider portion 30Rw, and the left stretching unit 30L has a wider portion 30Lw. In a case where the right stretching unit 30R and the left stretching unit 30L are pulled in a direction in which the whole circumference of the mounting band 100 is expanded, the wider portion 30Rw and the wider portion 30Lw play a role of a stopper. Therefore, such a situation that the right stretching unit 30R and the left stretching unit 30L are removed from the case 20 does not occur.

[Adjustment Mechanism] The case 20 has provided thereon an adjustment mechanism that adjusts a length of the stretching unit 30 to be accommodated in the case 20 by relatively moving the stretching unit 30 with respect to the case 20.

The adjustment mechanism includes an operation unit 60 that is rotated by an operation of the user, a pinion gear 63 that is rotated by rotation of the operation unit 60, and a right rack gear 30Rg and a left rack gear 30Lg that mesh with the pinion gear 63.

Figure 12:
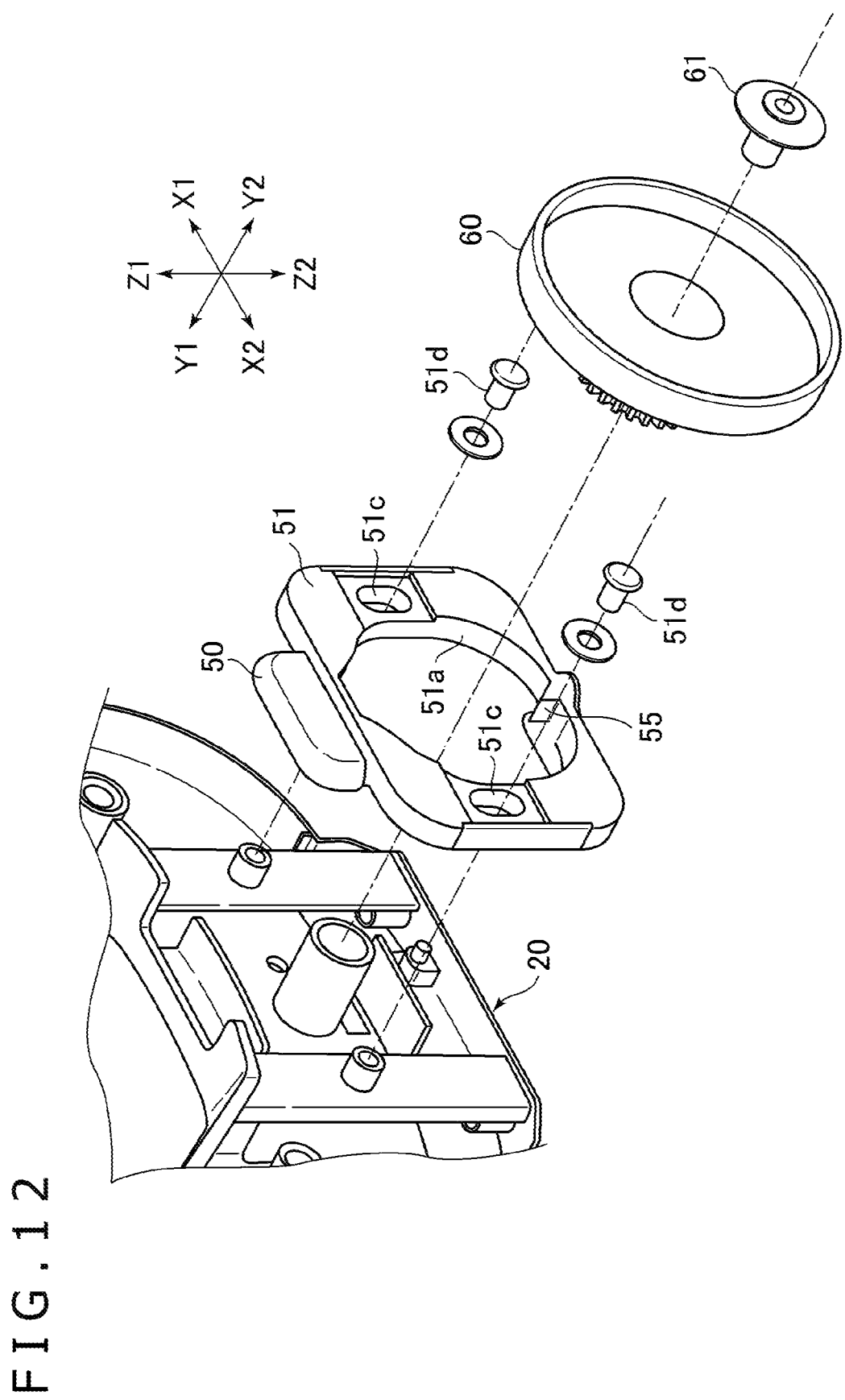
FIG. 12 is an exploded perspective view depicting an adjustment mechanism in the present embodiment.

The operation unit 60 has a shape of a disk as depicted in FIG. 12 and so forth and is attached to a rear portion of the case 20 by a fixture 61 such that it is rotatable around an axis of rotation extending in the forward and rearward direction. It is to be noted that the shape of the operation unit 60 is not restricted to that depicted in the figures and the operation unit 60 may have recesses and protrusions serving as a non-slip formation on a circumferential face thereof.

As depicted in FIG. 9, the right rack gear 30Rg is formed at an upper portion of the rear portion 30Rr of the right stretching unit 30R. The left rack gear 30Lg is formed at a lower portion of the rear portion 30Lr of the left stretching unit 30L as depicted in FIG. 9. Further, the pinion gear 63 is arranged between the right rack gear 30Rg and the left rack gear 30Lg in the upward and downward direction.

When the user rotates the operation unit 60 in the clockwise direction (clockwise) in FIG. 5, also the pinion gear 63 rotates in the clockwise direction. When the pinion gear 63 rotates in the clockwise direction in FIG. 9, the pinion gear 63 and the right rack gear 30Rg mesh with each other, and the right stretching unit 30R moves in the leftward direction (S2 direction) in FIG. 9. In other words, the right stretching unit 30R relatively moves with respect to the case 20 and the length of the portion of the right stretching unit 30R that is accommodated in the case 20 increases.

Similarly, when the pinion gear 63 rotates in the clockwise direction, the pinion gear 63 and the left rack gear 30Lg mesh with each other, and the left stretching unit 30L moves in the rightward direction (S1) in FIG. 9. In other words, the left stretching unit 30L relatively moves with respect to the case 20, and the length of the portion of the left stretching unit 30L that is accommodated in the case 20 increases.

When the user operates the operation unit 60, the mounting band 100 transits from the state depicted in FIGS. 3 to 5 to the state depicted in FIGS. 6 to 8 in such a manner as described above. In particular, the mounting band 100 transits from a state in which the whole circumference thereof is expanded to a state in which the whole circumference thereof is contracted.

The rear portion 30Rr of the right stretching unit 30R is narrower in width than the other portion of the right stretching unit 30R and is located below in the case 20. On the other hand, the rear portion 30Lr of the left stretching unit 30L is narrower in width than the other portion of the left stretching unit 30L and is located above in the case 20. Due to such a configuration as just described, the width of the case 20 in the upward and downward direction can be made compact. Also in a case in which the length of the portion to be accommodated in the case 20 is made longer, the rear portion 30Rr of the right stretching unit 30R and the rear portion 30Lr of the left stretching unit 30L do not interfere with each other.

[Restriction of Movement of Stretching Portion 30 and Release of Restriction] The adjustment mechanism further includes a mechanism for restricting relative movement of the stretching unit 30 with respect to the case 20 and a mechanism for releasing the restriction of the relative movement. In the following, these mechanisms are described mainly with reference to FIGS. 10 to 12. In FIGS. 11 and 12, views where parts configuring the adjustment mechanism are viewed from the left side face side are depicted.

The adjustment mechanism includes a lock gear 62 that rotates by rotation of the operation unit 60, a stopper 55 that restricts the rotation of the lock gear 62, a release button 50, a button supporting portion 51, and a spring 58. It is to be noted that the operation unit 60, the lock gear 62, and the pinion gear 63 are preferably configured for rotation around a common axis. The operation unit 60, the lock gear 62, and the pinion gear 63 may be formed from different members fixed to each other or may be configured from a single member.

The release button 50 projects at least at part thereof upwardly from an upper portion of the case 20 and is provided such that it can be pressed by the user. Further, the release button 50 is movable in the downward direction by being pressed by the user. The button supporting portion 51 is provided at a lower portion of the release button 50 such that it moves when the release button 50 moves. The release button 50 and the button supporting portion 51 may be configured as an integrated member.

Figure 10:
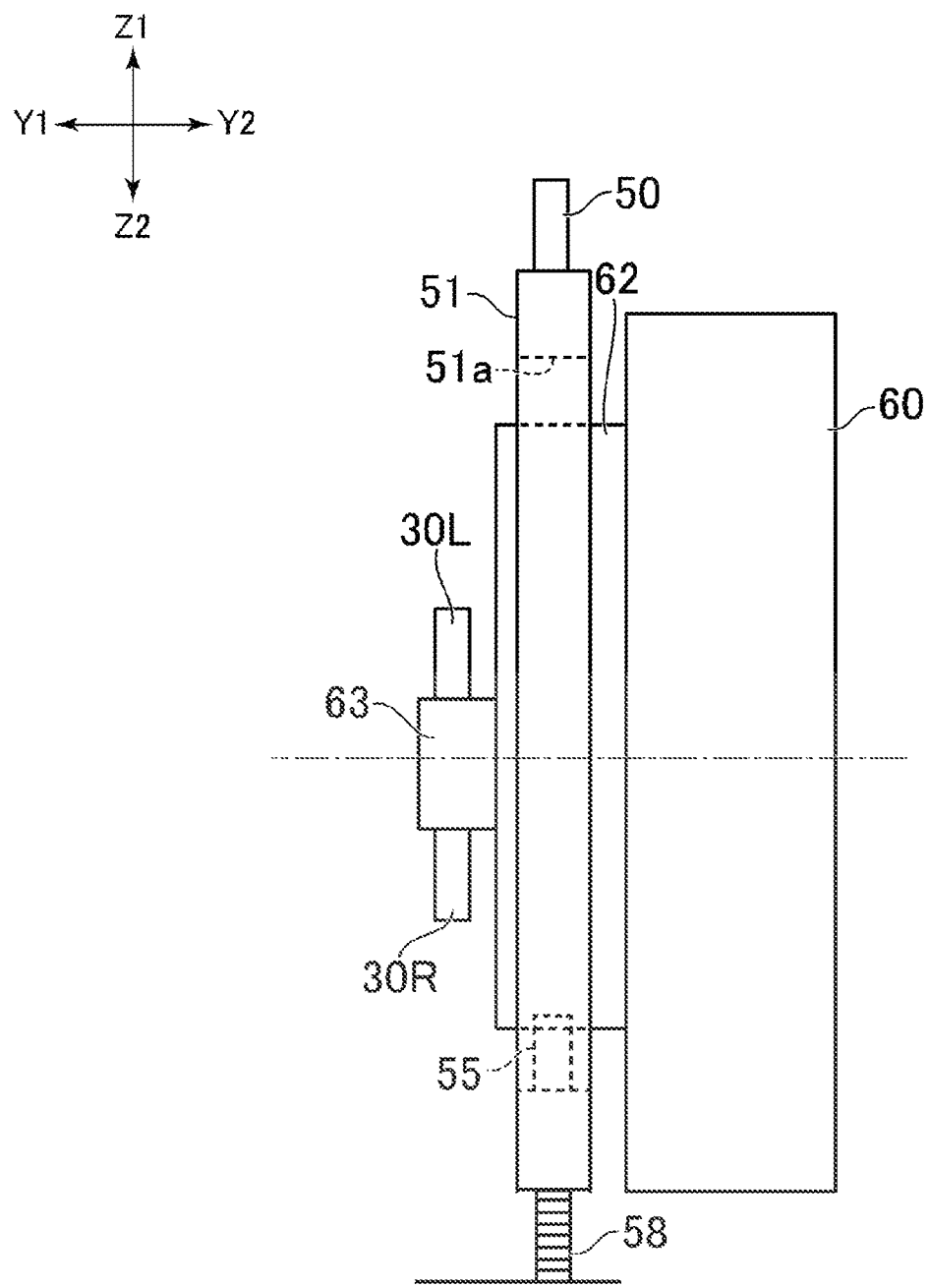
FIG. 10 is a schematic view depicting a state in which a motion of the stretching unit in the present embodiment is restricted.
Figure 11:
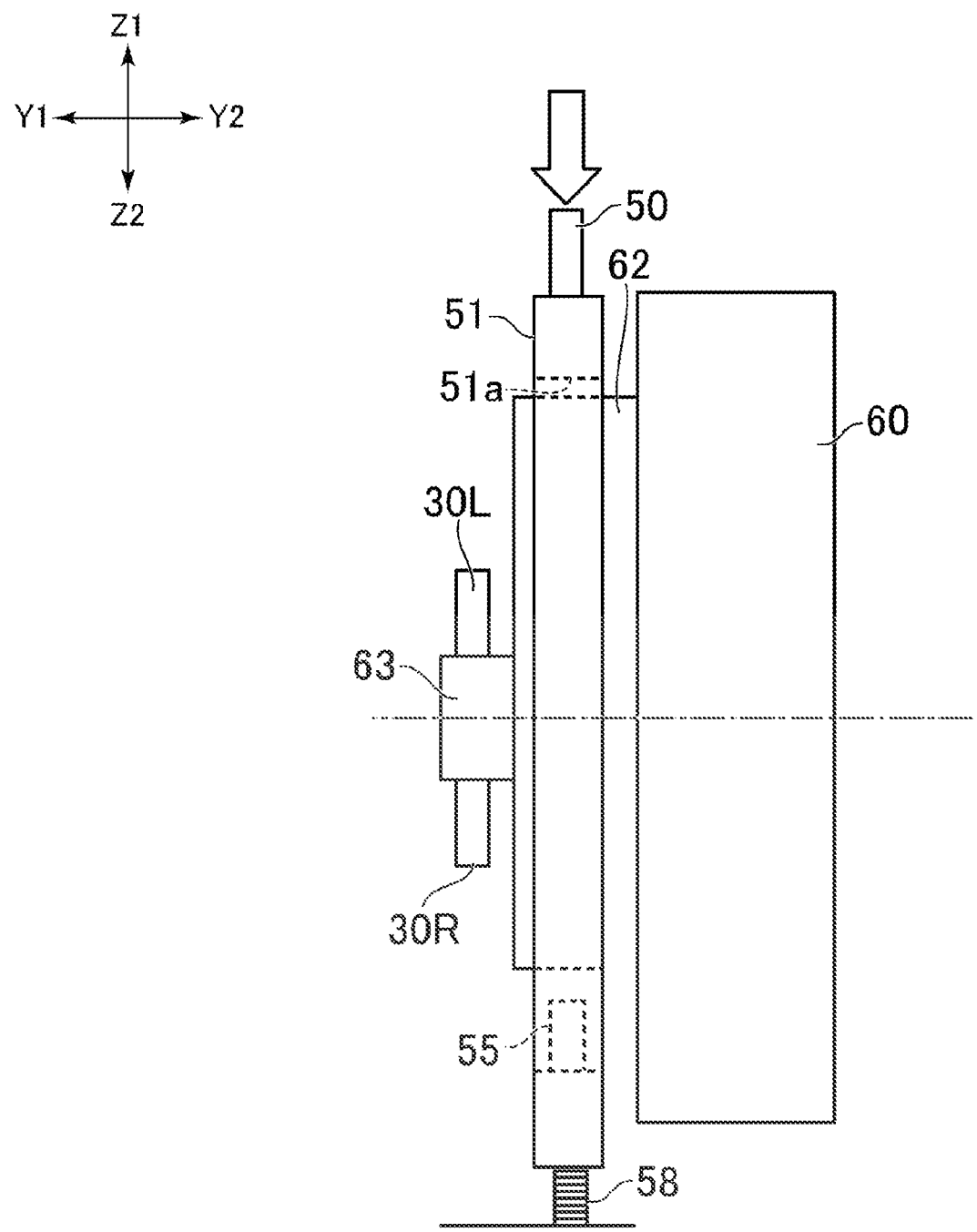
FIG. 11 is a schematic view depicting a state in which a motion of the stretching unit in the present embodiment is permitted.

Further, the spring 58 is provided so as to be in contact with a lower face of the button supporting portion 51 as depicted in FIGS. 10 and 11. If the release button 50 is pressed downwardly by the user, then the release button 50 and the button supporting portion 51 move downwardly while being acted upon by elastic force by the spring 58. Then, if the user releases the release button 50, then the release button 50 and the button supporting portion 51 are moved upwardly by the elastic force of the spring 58 until they return to a state before they are pressed by the user. In particular, the release button 50 and the button supporting portion 51 are positioned as depicted in FIG. 10 in a state in which they are not pressed by the user and are positioned as depicted in FIG. 11 in a state in which they are pressed.

It is to be noted that the button supporting portion 51 has elongated holes 51c extending in the upward and downward direction as depicted in FIG. 12 and is supported on the case 20 by supporting members 51d such as bolts that are fitted in the elongated holes 51c. The button supporting portion 51 is supported on the case 20 for upward and downward movement by a distance equal to the length of the elongated holes 51c in the upward and downward direction.

Further, the button supporting portion 51 has an opening 51a in which the lock gear 62 is fitted as depicted in FIG. 12. The stopper 55 is provided so as to catch the lock gear 62. In particular, the stopper 55 is provided on an inner face of the opening 51a of the button supporting portion 51 such that it projects toward the inner side of the opening 51a. Further, the stopper 55 has a face (left side face in FIG. 12) formed as a flat face extending vertically and has the other face (right side face in FIG. 12) formed as an inclined face.

If the user operates the operation unit 60 to exert force to rotate the operation unit 60 in the counterclockwise direction (counterclockwise), the lock gear 62 is caught by the left side flat face of the stopper 55. Therefore, the operation unit 60 does not rotate. Accordingly, even if the stretching unit 30 is pulled to the outer side of the case 20, the stretching unit 30 does not move relative to the case 20.

It is to be noted that the stopper 55 is not limited to that provided on the inner face formed by the opening 51a of the button supporting portion 51 but may be anything if it catches the lock gear 62 to restrict rotation of the lock gear 62.

On the other hand, where the user operates the operation unit 60 to exert force to rotate the operation unit 60 in the clockwise direction (clockwise) in FIG. 12, the lock gear 62 is brought into contact with the inclined face on the right side of the stopper 55 and exerts force acting in the leftward direction and force acting in the downward direction on the stopper 55. Consequently, the button supporting portion 51 moves downwardly a little against the elastic force of the spring 58. Therefore, the lock gear 62 rides over the inclined face on the right side of the stopper 55 and passes by the stopper 55. Consequently, the lock gear 62 rotates in the clockwise direction. Further, as the lock gear 62 rotates, the pinion gear 63 rotates. The pinion gear 63 rotates in the clockwise direction as described above, so that the length of the portion of the stretching unit 30 that is accommodated in the case 20 becomes longer.

As described above, when the user presses the release button 50 in the downward direction, the button supporting portion 51 moves downwardly together with the release button 50. As the button supporting portion 51 moves downwardly, also the stopper 55 moves downwardly, and therefore, the lock gear 62 is released from the state in which it is caught by the stopper 55. Since, in the state in which the release button 50 is pressed in the downward direction, the lock gear 62 is released from the state in which it is caught by the stopper 55, the lock gear 62 is permitted to rotate in the counterclockwise direction (counterclockwise). Therefore, if the user pulls the stretching unit 30 forwardly or pulls the case 20 rearwardly in the state in which the release button 50 is pressed in the downward direction, then the case 20 moves rearwardly relative to the stretching unit 30. Consequently, the mounting band 100 transits from the state depicted in FIGS. 6 to 8 to the state depicted in FIGS. 3 to 5. In particular, the mounting band 100 transits from the state in which the whole circumference thereof is contracted to the state in which the whole circumference thereof is expanded.

[Spring Member 40] The mounting band 100 includes a right spring member 40R, a right winding target member 70R, a left spring member 40L, and a left winding target member 70L. The right spring member 40R and the left spring member 40L are formed each as a generally-called constant load spring and as a belt-shaped leaf spring. The right spring member 40R and the left spring member 40L are accommodated in the case 20.

Also the right winding target member 70R and the left winding target member 70L are accommodated in the case 20. The right winding target member 70R and the left winding target member 70L are not fixed to the case 20 and are fitted in fitting regions 25 formed in the case 20. The fitting regions 25 are spaces partitioned by part of a frame configuring the case 20. The right winding target member 70R and the left winding target member 70L are fitted in the fitting regions 25 for rotation around center axes O1 extending in the upward and downward direction. Thus, since each winding target member 70 is not fixed to the case 20 and is fitted in the fitting region 25 and accommodated in the case 20, it rotates in the fitting region 25 according to winding and unwinding of the spring member 40.

Since the case 20 has the fitting regions 25 for housing the winding target members 70, part of the exterior configuring the case 20 projects rearwardly by an amount by which the fitting regions 25 are occupied. Referring to FIGS. 3 and 6, a portion that projects rearwardly by forming the fitting region 25 for accommodating the right winding target member 70R is indicated as a projection 23R, and a portion that projects rearwardly by forming the fitting region 25 for accommodating the left winding target member 70L is indicated as a projection 23L. In the HMD 1, the operation unit 60 described hereinabove is arranged between the projection 23R and the projection 23L. In particular, the operation unit 60 is attached to a recess portion 24 formed between the projection 23R and the projection 23L. By forming the forwardly depressed recess portion 24 between the projection 23R and the projection 23L in the case 20 in this manner, the magnitude of the case 20 in the forward and rearward direction can be made compact.

Figure 13:
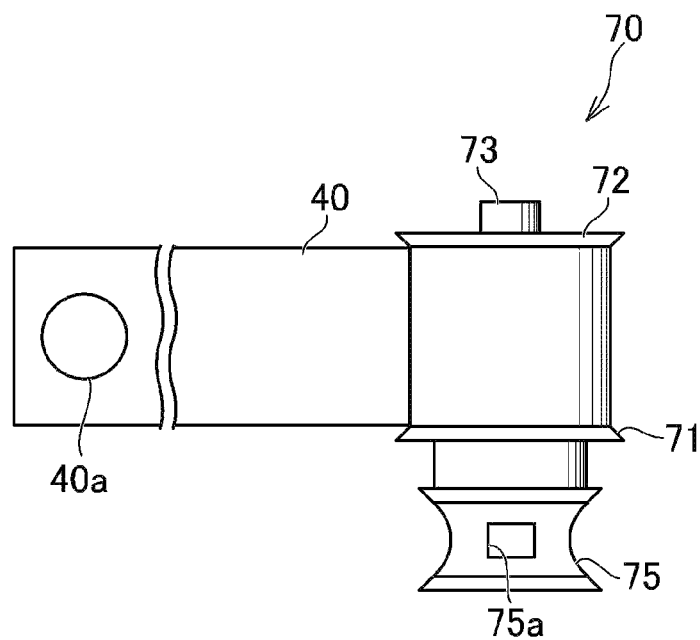
FIG. 13 is a view depicting a constant load spring in the present embodiment.

Also, it is preferable that the winding target member 70 has, at an upper portion thereof, an upwardly projecting shaft protrusion 73 as depicted in FIG. 13. Further, it is preferable that an opening 22 into which the shaft protrusion 73 is to be fitted is formed in the case 20 as depicted in FIGS. 5 and 8. Since the shaft protrusion 73 is fitted in the opening 22 in this manner, the posture of the winding target member 70 in the case 20 is stabilized.

The right spring member 40R is fixed at a front portion thereof to the right stretching unit 30R and is wound at a rear portion thereof around the right winding target member 70R. The left spring member 40L is fixed at a front portion thereof to the left stretching unit 30L and is wound at a rear portion thereof around the left winding target member 70L. In FIG. 13, a state in which the spring member 40 is wound at a rear portion thereof around the winding target member 70 is depicted.

It is to be noted that the spring member 40 has a fixation hole 40a at a front portion thereof as depicted in FIG. 13. The fixation method of the spring member 40 to the stretching unit 30 is not particularly restricted, and though not depicted, it is preferable, for example, that a projection or the like formed on the stretching unit 30 is press-fitted in the fixation hole 40a such that they are fixed to each other.

The winding target member 70 has a substantially cylindrical shape. Further, the winding target member 70 has flange portions 71 and 72 above and below a region thereon in which the spring member 40 is wound. Consequently, movement of the spring member 40 in the upward and downward direction is restricted.

The right spring member 40R is fixed to the right stretching unit 30R and generates elastic force that acts in a direction in which the right stretching unit 30R is accommodated into the case 20 (in the S2 direction of FIG. 9). The left spring member 40L is fixed to the left stretching unit 30L and generates elastic force that acts in a direction in which the left stretching unit 30L is accommodated into the case 20 (in the S1 direction of FIG. 9).

The spring member 40 has an unwinding amount from the winding target member 70 that changes according to the length of the stretching unit 30 accommodated in the case 20 and generates elastic force that acts in the direction in which the stretching unit 30 is accommodated into the case 20. In particular, the right spring member 40R generates elastic force that acts in the S2 direction in FIG. 9 on the right stretching unit 30R, and the left spring member 40L generates elastic force that acts in the S1 direction in FIG. 9 on the left stretching unit 30L. Since the spring member 40 generates elastic force in the direction in which the overall circumference of the mounting band 100 is contracted in this manner, the user can temporarily mount the mounting band 100 on the head H.

Further, the spring member 40 is a generally-called constant load spring as described hereinabove. In particular, the spring member 40 is a spring that generates fixed elastic force, irrespective of the unwinding amount from the winding target member 70. In other words, the spring member 40 is a spring in which first elastic force generated with a first unwinding amount and second elastic force generated with a second unwinding amount that is different from the first unwinding amount are equal to each other. Therefore, in a whatever length state the length of the whole circumference of the mounting band 100 is, the elastic force of the mounting band 100 acting in the direction in which the whole circumference of the mounting band 100 is contracted is fixed.

It is to be noted that it is preferable that the elastic force (load) generated by the spring member 40 is equal to or higher than 600 gf and equal to or lower than 800 gf (unit: gram weight [gf]). In particular, it is preferable that the spring member 40 generates elastic force of 600 gf or more and 800 gf or less, irrespective of the unwinding amount from the winding target member 70.

Figure 14:
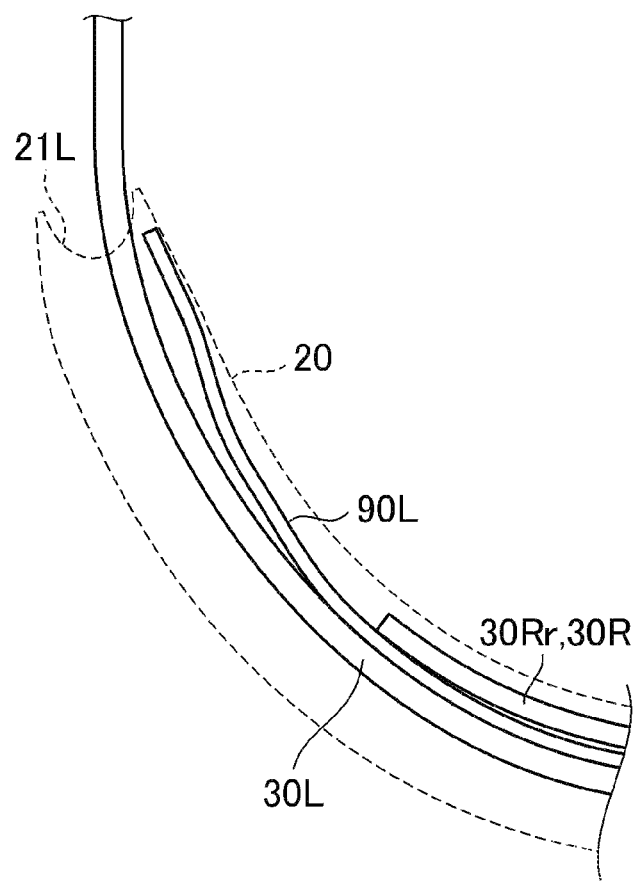
FIG. 14 is a view illustrating arrangement of a slip sheet.

[Slip Sheet 90] Furthermore, it is preferable that the mounting band 100 has a slip sheet 90 as depicted in FIG. 14. The slip sheet 90 is provided between the stretching unit 30 and the case 20 so as to extend along the stretching unit 30. In FIG. 14, a left slip sheet 90L provided between the left stretching unit 30L and the case 20 so as to extend along the left stretching unit 30L is depicted. It is to be noted that, though not depicted, it is good that also a right stretching unit 90R is provided between the right stretching unit 30R and the case 20 so as to extend along the right stretching unit 30R.

As the slip sheet 90, it is preferable that a new light film (registered trademark) by Saxin Corporation is used, for example. Since the slip sheet 90 is provided, relative movement of the stretching unit 30 with respect to the case 20 is smoothened.

Further, it is preferable that the rear portion 30Rr of the right stretching unit 30R is inserted between the left slip sheet 90L and the case 20 as depicted in FIG. 14. In particular, it is preferable that the left slip sheet 90L is arranged between the left stretching unit 30L and the rear portion 30Rr of the right stretching unit 30R. With this arrangement, the rear portion 30Rr of the right stretching unit 30R and the left stretching unit 30L can be avoided from interfering with each other. Therefore, even in a state in which the length of the right stretching unit 30R accommodated in the case 20 is long, it is possible to move the right stretching unit 30R smoothly in the case 20. Though not depicted, it is preferable that the rear portion 30Lr of the left stretching unit 30L is inserted between the right stretching unit 90R and the case 20 similarly. In particular, it is preferable that the right stretching unit 90R is arranged between the right stretching unit 30R and the rear portion 30Lr of the left stretching unit 30L.

[Antenna] Further, it is preferable that the mounting band 100 includes an antenna board 80 accommodated in the case 20 and having mounted thereon an antenna for receiving a wireless signal and includes an antenna cable (coaxial cable) 81 connected to the antenna board 80. It is good for the HMD 1 to perform transmission and reception of data to and from an external apparatus by wireless communication through the antenna. It is to be noted that, in order to avoid complicated illustration of the drawings, illustration of the antenna cable 81 is omitted in FIGS. 1, 2, 4 and 7.

FIGS. 5 and 8 depict an example in which the antenna board 80 is arranged between the right winding target member 70R and the operation unit 60. The antenna cable 81 extends forwardly toward the device main body 10 through the opening 21L of the case 20 in which the left stretching unit 30L is fitted.

Since the magnitude of the whole circumference of the mounting band 100 is expanded or contracted, it is preferable that the antenna cable 81 can also adjust the length of a portion to be accommodated into the case 20. In view of this, in the mounting band 100, a cable winding target portion 75 around which the antenna cable 81 is wound is provided on the winding target member 70. Further, as depicted in FIG. 13, a hole 75a is formed in the cable winding target portion 75, and the antenna cable 81 is fitted in the hole 75a and is wrapped around the cable winding target portion 75. Therefore, together with rotation of the winding target member 70, the unwinding amount of the antenna cable 81 from the cable winding target portion 75 changes.

It is to be noted that, although the cable winding target portion 75 is provided on both of the right winding target member 70R and the left winding target member 70L, FIG. 5 and so forth indicate an example in which the antenna cable 81 is wound only on the cable winding target portion 75 of the left winding target member 70L.

As described above, as the stretching unit 30 is relatively moved with respect to the case 20, the winding target member 70 rotates, and the unwinding amount of the spring member 40 changes. Similarly, as the stretching unit 30 is relatively moved with respect to the case 20, the winding target member 70 rotates and the unwinding amount of the antenna cable 81 that is unwound from the cable winding target portion 75 changes. Therefore, the antenna cable 81 is not put into a state in which it is bent significantly. As a result, such a situation that the bent antenna cable 81 is exposed to the outside of the case 20 to deteriorate the appearance is prevented. In the HMD 1, the antenna cable 81 is wound on the cable winding target portion 75L of the winding target member 70 that is farther from the antenna board 80 among the two winding target members 70 as depicted in FIG. 5. Consequently, a sufficient extra length can be assured from the antenna board 80 to the cable winding target portion 75, and a winding operation of the antenna cable 81 on the cable winding target portion 75 upon assembly is facilitated.

It is to be noted that, although the example depicted indicates an example in which the single antenna board 80 is provided, this is not restrictive, and a plurality of antenna boards on each of which an antenna is mounted may be provided.

[Wearing Method of HMD 1] First, the user would depress the release button 50 and keep this state. Consequently, a state in which the stretching units 30 and the case 20 can relatively move to each other is kept. In this state, the user would pull the case 20 rearwardly to expand the whole circumference of the mounting band 100 to such a degree that the own head H of the user can be put into the inside of the mounting band 100. Further, in the state in which the depression of the release button 50 is maintained, the user would adjust the whole circumference of the mounting band 100 to a size conforming to the size of the own head H. At this time, the mounting band 100 is placed into a state in which it is temporarily mounted on the head H of the user by elastic force of the spring member 40. In the state in which the mounting band 100 is temporarily mounted on the head H, the user would stop the depression of the release button 50 to put the stretching units 30 and the case 20 into a state in which they cannot relatively move to each other in the direction in which the whole circumference of the mounting band 100 is expanded. In this state, the user would grip and rotate the operation unit 60 in the clockwise direction to increase the length of the stretching units 30 to be accommodated in the case 20. In other words, the stretching units 30 are relatively moved with respect to the case 20 such that the whole circumference of the mounting band 100 is reduced. In a state in which the tightening condition to the head H becomes suitable, the user would stop the operation of the operation unit 60. By such a procedure as described above, the user can wear the HMD 1 on the head H.

In the HMD 1 described above, since the spring member 40 that is a constant load spring is used, when the stretching unit 30 or the case 20 is pulled in the direction in which the whole circumference of the mounting band 100 is expanded, the elastic force acting in the direction in which the whole circumference of the mounting band 100 is contracted is fixed. Therefore, even when the user expands the mounting band 100 by a great amount according to the own head in order to mount the mounting band 100, an excessive load does not act upon the user, and the user can temporarily mount the mounting band 100 easily.

Further, since the elastic force acting in the direction in which the whole circumference of the mounting band 100 is contracted does not increase, irrespective of the magnitude of the whole circumference of the mounting band 100, the movable range of the mounting band 100 can be increased in comparison with the conventional configuration. In particular, with the mounting band 100, the whole circumference is set to 620 mm in the state in which it is expanded most and is set to 470 mm in the state in which it is contracted most. In this manner, by relative movement of the stretching unit 30 with respect to the case 20, the whole circumference changes by 150 mm between the most expanded state and the most contracted state. It is to be noted that the mounting band 100 may be configured such that the whole circumference thereof in the most expanded state can be further increased according to a demand of the user. In other words, the mounting band 100 may be configured such that the whole circumference thereof changes by 150 mm or more between the most expanded state and the most contracted state.

REFERENCE SIGNS LIST

1: Head mounted display
20: Case
30: Stretching unit
40: Spring member
70: Winding target member
100: Mounting band

The invention claimed is:

1. A head mounted display having a mounting band for surrounding a head of a user, the mounting band including:
a case that configures a rear portion of the mounting band;
a stretching unit that configures a side portion of the mounting band and that extends from a front side toward a rear side, at least part of a rear portion of the stretching unit being accommodated in the case, where the stretching unit includes a right stretching unit that configures a right side portion of the mounting band and a left stretching unit that configures a left side portion of the mounting band;
an adjustment mechanism that adjusts a length of the stretching unit to be accommodated in the case by relatively moving the stretching unit with respect to the case;
a winding target member accommodated in the case, where the winding target member includes a right winding target member and a left winding target member such that: (i) the right target winding member is not fixed to the case and is fitted in a right fitting region formed in the case, and (ii) the left winding target member is not fixed to the case and is fitted in a left fitting region formed in the case; and
a spring member which is fixed at a front portion thereof to the stretching unit and is wound at a rear portion thereof on the winding target member and in which an unwinding amount from the winding target member changes according to the length of the stretching unit accommodated in the case, the spring member generating elastic force to act in a direction in which the stretching unit is accommodated into the case, first elastic force generated by a first unwinding amount and second elastic force generated by a second unwinding amount that is different from the first unwinding amount being equal to each other, where the spring member includes a right spring member which is fixed at a front portion thereof to the right stretching unit and is wound at a rear portion thereof on the right winding target member, and a left spring member which is fixed at a front portion thereof to the left stretching unit and is wound at a rear portion thereof on the left winding target member,
wherein the case has a recess portion depressed forwardly between the right fitting region and the left fitting region, and at least part of the adjustment mechanism is attached to the recess portion.

2. The head mounted display according to claim 1, wherein
the adjustment mechanism includes an operation unit that is rotated by operation of a user, a pinion gear that rotates together with rotation of the operation unit, a right rack gear formed at a rear portion of the right stretching unit and meshing with the pinion gear, and a left rack gear formed at a rear portion of the left stretching unit and meshing with the pinion gear,
the right stretching unit is moved so as to be accommodated into the case together with rotation in one direction of the operation unit, and
the left stretching unit is moved so as to be accommodated into the case together with rotation in the one direction of the operation unit.

3. The head mounted display according to claim 2, comprising:
a right slip sheet provided between the right stretching unit and the case so as to extend along an extending direction of the right stretching unit; and
a left slip sheet provided between the left stretching unit and the case so as to extend along an extending direction of the left stretching unit.

4. The head mounted display according to claim 3, wherein
a rear end portion of the right stretching unit is inserted between the case and the left slip sheet, and
a rear end portion of the left stretching unit is inserted between the case and the right slip sheet.

5. The head mounted display according to claim 2, wherein the adjustment mechanism includes a stopper for restricting rotation in an opposite direction to rotation in the one direction of the operation unit and a release button for releasing the restriction by the stopper.

6. The head mounted display according to claim 1, wherein the winding target member is provided for rotation around a center axis extending in an upward and downward direction.

7. The head mounted display according to claim 6, wherein the winding target member is not fixed to the case and is fitted in a fitting region formed in the case.

8. The head mounted display according to claim 1, comprising:
an antenna board accommodated in the case and having an antenna for receiving a signal mounted thereon; and
an antenna cable connected to the antenna board and extending forwardly along the stretching unit, wherein
at least one of the right winding target member and the left winding target member includes a cable winding target portion on which the antenna cable is wound.

9. The head mounted display according to claim 1, wherein
the case has an opening through which the stretching unit is inserted, and
at least part of the stretching unit is greater in width in an upward and downward direction thereof than the opening.

10. The head mounted display according to claim 1, wherein the spring member is a band-shaped leaf spring.

11. The head mounted display according to claim 1, wherein the first elastic force and the second elastic force are equal to or more than 600 gf and equal to or less than 800 gf.

12. The head mounted display according to claim 1, wherein a magnitude of a whole circumference of the mounting band changes by 150 mm or more between a maximum expanded state and a maximum contracted state by relative movement of the stretching unit with respect to the case.

\* \* \* \* \*